Dec. 8, 1970 T. M. L. CAGNAC ET AL 3,546,682

MEMORY USING INTEGRATED CIRCUITS AS UNITARY CROSSPOINTS

Filed Feb. 28, 1967 3 Sheets-Sheet 1

Inventors
THÉRÈSE M. L. CAGNAC
ALAIN P. LE GALL
RAPHAËL G. YELLOZ
By Charles L. Johnson Jr.
Attorney Inventors
THÉRÈSE M. L. CAGNAC
ALAIN P. LE GALL
RAPHAËL G. YELLOZ
By Charles L. Johnson
Attorney Dec. 8, 1970 T. M. L. CAGNAC ET AL 3,546,682

MEMORY USING INTEGRATED CIRCUITS AS UNITARY CROSSPOINTS

Filed Feb. 28, 1967 3 Sheets-Sheet 3

Inventors
THÉRÈSE M. L. CAGNAC
ALAIN P. LE GALL
RAPHAËL G. YELLOZ
By Charles L. Johnson Jr.
Attorney 3,546,682
Patented Dec. 8, 1970

3,546,682

MEMORY USING INTEGRATED CIRCUITS AS UNITARY CROSSPOINTS

Thérèse Marie Leonie Cagnac, Alain Pierre Le Gall, and Raphael Guy Yelloz, Paris, France, assignors to International Standard Electric Corporation, New York, N.Y., a corporation of Delaware Filed Feb. 28, 1967, Ser. No. 619,452
Claims priority, application France, Mar. 8, 1966, 52,421
Int. Cl. G11b *11/40, 7/00;* H03h *3/286*
U.S. Cl. 340—173 2 Claims

ABSTRACT OF THE DISCLOSURE

A word-organized integrated circuit elementary memory comprising a matrix of memory unit cells. The control signals of the memory cells are supplied by word logical circuits and by digit logical circuits. A word decoding circuit, in response to binary code signals, enables the selection of one of the word lines for a given operation.

The present invention concerns a non-destructive readout memory of small capacity which may be achieved by means of circuits known as "integrated circuits" and which comprises, besides the memory elements themselves, the selection circuits for the read, write and clear operations.

In this memory, each unit cell is constituted by a flip-flop circuit requiring a very low power for switching, so that the selection circuits may be achieved with active elements of the same type as those of the said flip-flop. The matrix memory and its selection circuits may be grouped on one same substrate of the integrated circuit. By way of example, a word-organized memory according to the invention, for the storage of sixteen words of four digits each, comprises only fourteen output conductors.

The active elements which have been mentioned may be either classical transistors such as planar-epitaxial transistors, or field-effect transistors. By way of a non-limitative example one shall describe an integrated circuit memory achieved by using classical transistors of the NPN type.

The object of the present invention is thus to realize a word-organized matrix memory which comprises its own selection circuits, said memory being so designed to minimize the number of output terminals and to facilitate its achievement on a substrate of circuit known as "integrated" circuit.

The present invention will be particularly described with reference to the accompanying drawings in which.

In the description of the circuits, the theshold voltage (base-emitter voltage drop V*be* for a normal transistor) and the collector-emitter voltage V*ce* of saturated or conducting transistors, will be taken into account when required; the values of these voltages are respectively of 0.6 volt and 0.2 volt for normal silicon transistors. The corresponding voltages are generally higher in the case of field-effect transistors.

Figure 1:
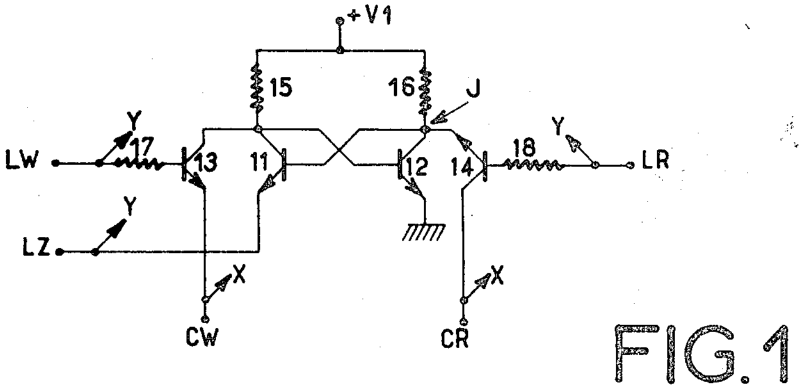
FIG. 1 represents the detailed diagram of the memory unit cell.

The unit memory cell shown on FIG. 1 may be of the type described in the pending application of A. J. L. Chambet-Falquet-A. P. Le Gall-R. G. Yelloz, Serial No. 564,687 filed July 12, 1966, for a Non-Destructive Readout Memory With Short Access Time. In this figure, the transistors 11 and 12 and the resistors 15 and 16 constitute a flip-flop of well-known configuration supplied by the positive voltage source V1. It will be assumed that this flip-flop is in the 1 state when the transistor 12 is blocked, and that it is in the 0 state when the transistor 11 is blocked. As a result, the point J is at a potential V*be* or V*ce* according to whether the flip-flop is in the 1 state or in the 0 state. The transistors 13 and 14 are used for controlling the switching of the flip-flop and the non-destructive readout of its state.

In order to study the operation of the memory cell, it will be assumed that, at rest, all its output terminals are brought to the ground potential except the output terminal CW which is brought to the potential +V1. Under these conditions, the transistors 13 and 14 are blocked and the collectors of the transistors 11 and 12 are isolated from the output terminals.

Figure 6:
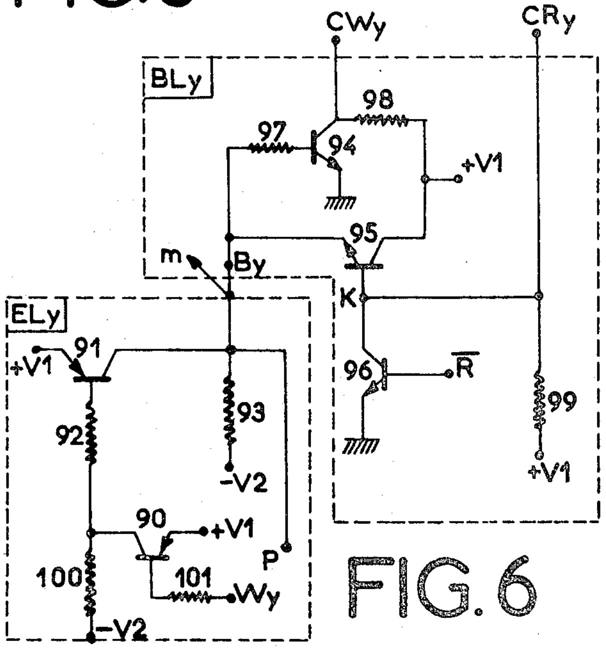
FIG. 6 represents the digit selection circuit.

In order to write a digit 1, i.e. to set the flip-flop to the 1 state, the input LW is brought to the potential +V1 and the input CW to the ground potential, so that the transistor 13 is saturated, the base current being limited by the resistor 17. The transistor 12, the base of which is thus brought to a voltage V*ce*, is blocked and the flip-flop sets to the 1 state. For reading the information written in the flip-flop, the inputs LR and CR are brought simultaneously to the potential +V1. If point J is at a potential V*be* or V*ce* substantially lower than V1–V*be*, transistor 14 is saturated with a base current limited by the resistor 18. The potential +V1 is applied to input CR through a resistor as shown in FIG. 6 (resistor 99) which will be described hereinafter so that a current flows through the transistor 14. The potential V*be* or V*ce* of the point J appears on the output CR except for the voltage drop V*ce* in the transistor 14, an constitutes the readout signal of the memory cell.

Last, to reset the flip-flop to the 0 state, the input LZ is brought to the potential +V1, so that the collector and the emitter of the transistor 11 are at the same potential. If the flip-flop is in the 1 state (the transistor 11 is saturated), the flip-flop resets to the 0 state as the transistor 11 is blocked.

The memory cell just described is provided for constituting a word-organized matrix memory, and more precisely, an *elementary memory* which may be achieved in particular by using integrated circuits. This elementary memory comprises X lines 1, 2 . . . *x* . . . X and Y columns 1, 2 . . . *y* . . . Y for storing X words each one comprising Y digits. The terminal references of this cell concern this arrangement and the first capital letter means that this terminal is connected either to a line or to a column, according to whether it is a "L" or a "C." The second reference letter W, R, Z concerns the operation carried out and means respectively, writing, reading and clearing (resetting to zero).

TABLE I

| | Terminal | Rest voltage | Selection signals | | |
|---|---|---|---|---|---|
| | | | Writing | Readout | Clearing |
| 1 | LW | 0 | +V1 | | |
| 2 | CW | +V1 | 0 | | |
| 3 | LR | 0 | | +V1 | |
| 4 | CR | 0 | | +V1 | |
| 5 | LZ | 0 | | | +V1 |
| 6 | Operation signal | | W | R | Z |
| | | *a* | *b* | *c* | *d* |

Table I hereabove represents, on the lines 1 to 5, the amplitudes of the signals applied to the terminals of a memory cell located at the intersection of the line $x$ and the column $y$ in the different operation phases just studied. The columns $a$, $b$, $c$, $d$ are assigned to the voltages applied to these terminals respectively when this cell is not selected (rest) or when it is selected for writing, reading or clearing.

In order to facilitate the reading of the table, the voltages which are not modified during the considered operations and which are the rest voltages shown in column $a$, have not been reported in columns $b$, $c$, $d$. Line 6 shows the *operation signals*, W. R. Z, which control the execution of a writing, a reading or a clearing in the unit cell.

The voltages shown on Table I have been chosen such as a non-selected memory cell should not be disturbed, during writing or reading, by the application of a single selection signal.

Thus, the transistor 13 can be saturated only when its inputs LW and CW are brought, respectively, to potentials +V1 and zero. The saturation of the transistor 14 depends only upon the application of a signal +V1 on its input LR, and no perturbation can occur during reading. The same goes for the clearing which depends only upon the application of a signal +V1 on the input LZ.

Figure 2:
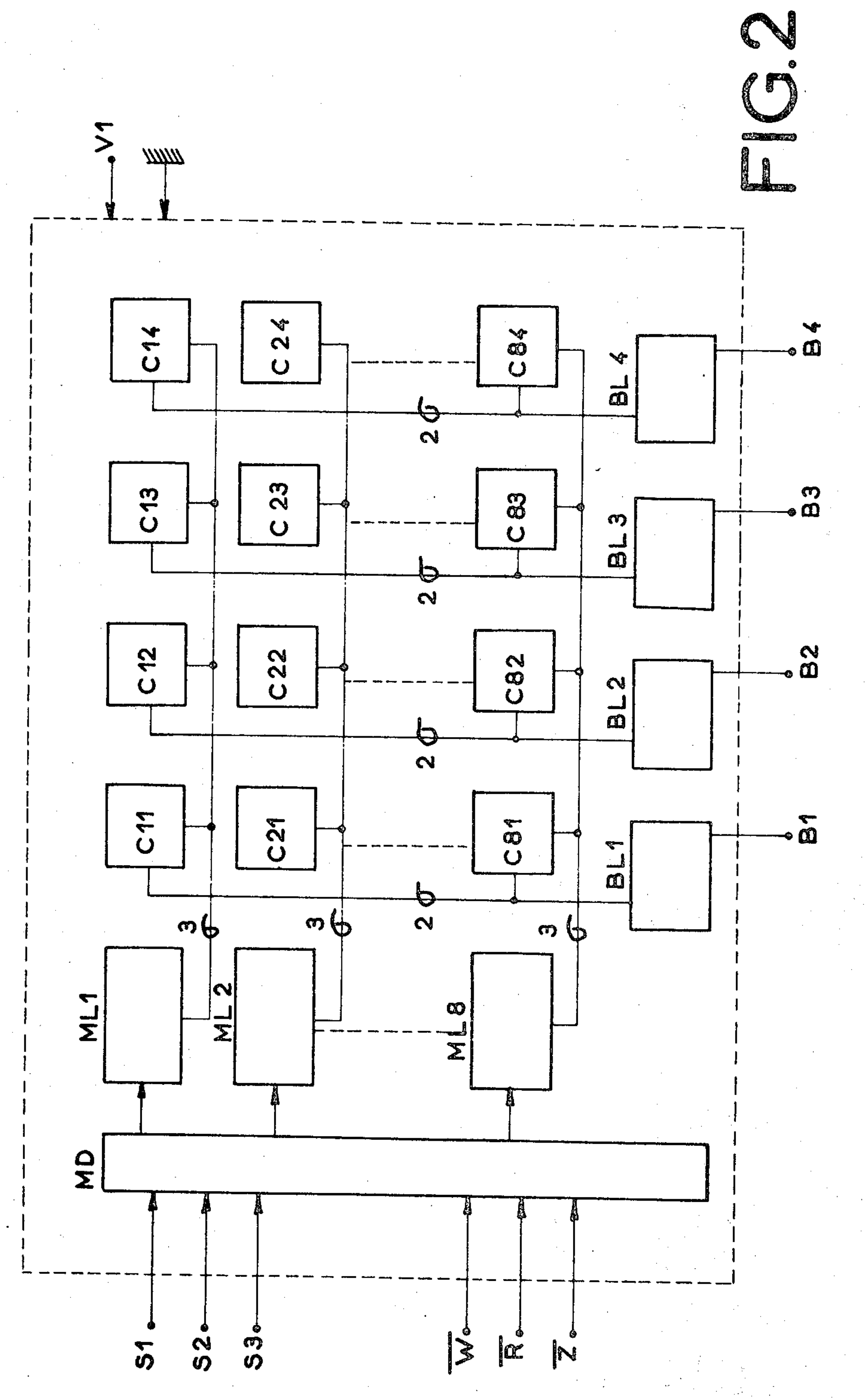
FIG. 2 represents an elementary matrix memory.

FIG. 2 represents, in a schematic way, a word-organized integrated circuit elementary memory in which $X=8$ and $Y=4$. The cells are referenced C11, C12, C13, C14 for those associated to the first line and C81, C82, C83, C84 for those associated to the eighth line. The control signals of these memory cells are supplied by the word logical circuits ML1, ML2 . . . ML8 and by the digit logical circuits BL1, BL2, BL3, BL4. The word decoding circuit MD enables the selection of one of the lines for a given operation.

In order to simplify the figure, the line conductors which are connected to the inputs LW, LR, LZ of each cell, have been grouped into one single conductor bearing the reference "3." The same goes for the two-line conductors which are connected to the inputs CW and CR and which are grouped into one single conductor bearing the reference "2."

Each one of the word logical circuits supplies in parallel the Y cells associated to a line and this has been shown symbolically on FIG. 1 by the multiplexing arrow placed on the terminals LW, LZ, LR and bearing the reference Y. In the same way, the multiplexing arrow placed on the terminals CW, CR bears the reference X.

The elementary memory of FIG. 2 comprises twelve terminals to which are applied the supply voltage +V1, the ground potential, the signals S1, S2, S3 which constitute—in binary code—the number which enables the selection of one line, the complementary signal $\overline{W}$, $\overline{R}$, $\overline{Z}$ of the operation signals defined previously and the column selection signals during writing. The terminals to which are applied these signals are referenced B1 to B4, and they are also used during reading for collecting the readout signals.

Figures 3, 5:
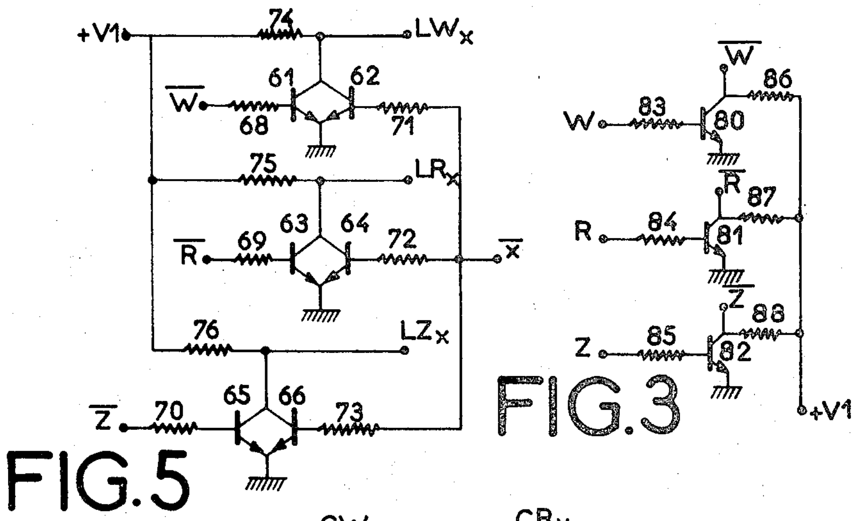
FIG. 3 represents the circuit for complementing the operation signals.
FIG. 5 represents a word selection circuit.

FIG. 3 represents a circuit which produces the complementary signals $\overline{W}$, $\overline{R}$ and $\overline{Z}$ of the operation signals, which comprises three inverter circuits constituted by the transistors 80 to 82 and the resistances 83 to 88. It will be noted that this circuit is placed outside the elementary memory of FIG. 2.

Figure 4:
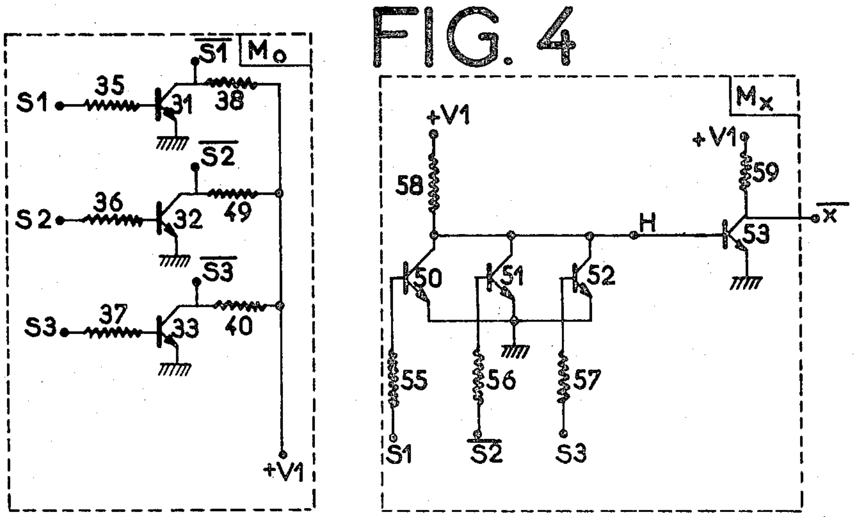
FIG. 4 represents the word decoding circuit.

FIG. 4 represents the detailed diagram of the circuit MD of FIG. 2 which comprises the group of inverters M*o* and eight identical word selection circuits, such as the circuit M$x$ which delivers the signal controlling the selection of the word located on the line $x$. The circuit M*o*, which comprises the transistors 31 to 33 and the resistors 35 to 40, is identical to that described in FIG. 3 and delivers the signals $\overline{S1}$, $\overline{S2}$, $\overline{S3}$.

The circuit M$x$ comprises the transistors 50 to 53 and the resistances 55 to 59. The first three of these transistors are connected in such a way as to form a three-input AND circuit in which the point H is always at the ground potential except when a signal of amplitude V1 is applied to all three inputs. Since this circuit is provided for selecting a line under the control of the binary code 010, the signals applied to these inputs are the signals S1, $\overline{S2}$, and S3. The point H is thus at the potential +V1 when the line $x$ is selected and the corresponding signal will be referenced $x$.

The transistor 53 constitutes an inverter circuit which deliver a signal $\bar{x}$ on its collector, this latter being thus at the ground potential when the line is selected.

FIG. 5 represents one of the word logical circuits, for instance the circuit ML$x$ reserved to the line $x$, which comprises the transistors 61 to 66 and the resistors 68 to 76. Each one of the pairs of transistors 61–62, 63–64, 65–66, constitutes a two-input AND circuit similar to the three-input AND circuit described in relation with FIG. 4. The first one of these circuits receives the signals $\overline{W}$ and $\bar{x}$, so that it delivers a signal of amplitude +V1 on the output LW$x$ connected to the Y inputs LW of the Y memory cells associated to the line $x$ when said line is selected for a writing. In the opposite case, this output LW$x$ is at the ground potential. The same goes for the second and third circuits which deliver signals of amplitude +V1 respectively, on the output LR$x$ and on the output LZ$x$ which are multiplexed on the Y inputs LR and LZ of the Y cells of the line $x$. These three signals do have the required values for a correct operation of the memory cell such as they are shown in table I.

FIG. 6 represents a digit logical circuit, for instance, the circuit BL$y$, as well as the write control circuit EL$y$ associated to the column $y$. As it has been seen previously, this circuit which receives a signal W$y$ when a digit must be written in the column $y$, is placed outside the elementary memory of FIG. 2, and it is common to all the columns of a memory plane constituted by a matrix arrangement of elementary memories. If this memory plane is provided for the storage of $m.X$ words, this circuit supplies in parallel the columns $y$ of the $m$ elementary memories located vertically.

The circuit EL$y$ comprises the transistors PNP 90, 91 and the resistors 92, 93, 100, 101; the circuit BL$y$ comprises the transistors NPN 94, 95, 96 and the resistors 97, 98, 99. In the circuit EL$y$, the resistors 100 and 93 are brought to a negative potential V2.

TABLE II

<table>
<tr><th rowspan="3"></th><th colspan="11">Transistor</th></tr>
<tr><th colspan="2">90</th><th colspan="2">91</th><th colspan="2">96</th><th colspan="3">95</th><th colspan="2">94</th></tr>
<tr><th>Bs</th><th>Et</th><th>Bs</th><th>Et</th><th>Bs</th><th>Et</th><th>Bs</th><th>Et</th><th>Em</th><th>Et</th><th>Cl.</th></tr>
<tr><td>Writing</td><td>+V1</td><td>Bl.</td><td>+V1−Vce (92)</td><td>St</td><td rowspan="2">+V1</td><td rowspan="2">St</td><td rowspan="2">Vce</td><td>Bl.</td><td>+V1</td><td>St</td><td>Vce</td></tr>
<tr><td>Rest</td><td rowspan="2">0</td><td rowspan="2">St</td><td rowspan="2">−V2 (92–100)</td><td rowspan="2">Bl.</td><td>Ps</td><td>−0.4 v.</td><td>Bl.</td><td rowspan="2">+V1</td></tr>
<tr><td>Readout</td><td>0</td><td>Bl.</td><td>Δu</td><td>Ps</td><td>Δu′</td><td>Bl.</td></tr>
</table>

Table II hereabove indicates the voltages which are present on some of the electrodes of the transistors of these circuits, and their state in the different cases of operation. The abbreviations of this table have the following meaning:

B*s*, E*m*, C*l*. mean respectively base, emitter and collector,

E*t* means "state" of a transistor,

B*l*., S*t*, P*s* means that the transistor considered is respectively blocked, saturated or conductive, this last state being, as the case may be that of the transistor 95 in emitter-follower configuration.

It will be noted that the voltages shown in the columns 95 B*s* and 94 C*l*. are those appearing on the terminals CR*y* and CW*y* connected respectively to all the terminals CR and CW of the memory cells associated to the column *y*.

During the writing, the transistor 91 is saturated and the transistor 95, the emitter of which is positive with respect to the base, is blocked. The transistors 94 and 96 are saturated thus bringing the conductors CW*y* and CR*y* to the ground potential (more precisely to the voltage V*ce*). At the termination of the writing period, the transistor 91 is blocked and the emitter of the transistor 95 is connected to the voltage source —V2 through the resistor 93.

During the rest periods, the potential of the terminal CR*y* (which is the base of the transistor 95), is equal to +V*ce*, so that the emitter of the transistor 95 is at the potential $+Vce-Vbe$, or approximately —0.4 v., this blocking the transistor 94. During the reading period, this terminal CR*y* is brought to a potential $\Delta u$ equal either to $Vce+Vce$ (approximately 0.4 v.) or to $Vce+Vbe$ (approximately 0.8 v.), so that the emitter potential $\Delta u'$ of the transistor 95 is either $Vce+Vce-Vbe$ (approximately —0.2 v.) or $Vce+Vbe-Vbe$ (approximately +0.2 v.), these two voltages constituting, as it has been explained hereabove, the output signals of the memory.

As stated hereinbefore, the elementary memory is designed to be constructed in integrated circuit form and assembled in a multiplane matrix memory. The interconnections are carried out easily by welding the output terminals of the elementary memories on column and line conductors engraved on double face printed circuits, or on multilayer circuits.

The number of outputs of an elementary memory for storing X words of Y digits will now be determined by setting $X=2^a$, in order to minimize the number of terminals which are necessary for the line selection (terminals S1, S2, S3 in the example of FIG. 2). One has thus:

one ground terminal
one supply terminal connected to the source +V1
"*a*" selection terminals
three operation control terminals (signals $\overline{W}, \overline{R}, \overline{Z}$, FIG. 2)
Y column terminals (terminals B1 to B4, FIG. 2).

The total number of terminals of an elementary memory is thus: $N=5+a+Y$.

Figure 7:
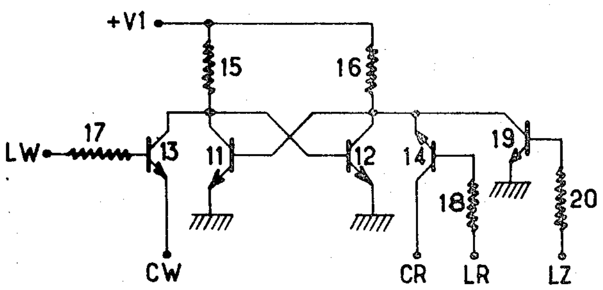
FIG. 7 represents a first alternative solution of the unit memory cell.
Figure 8:
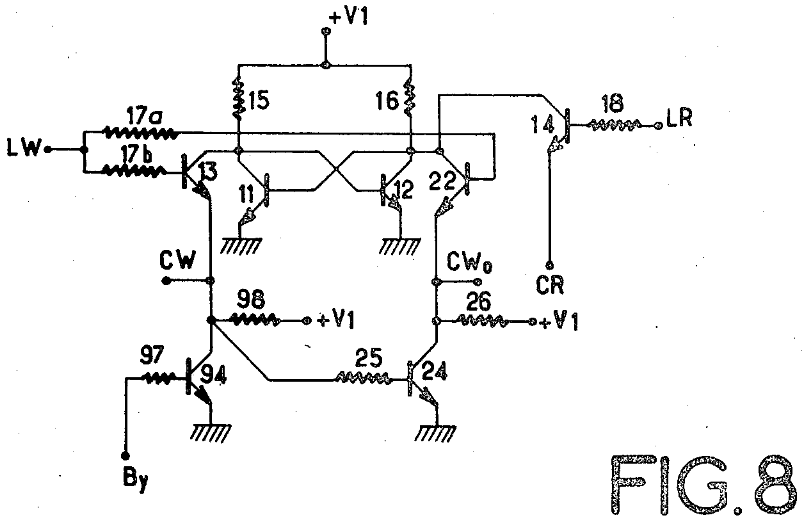
FIG. 8 represents a second alternative solution of the memory unit cell.

For instance, the various combinations of thirty-two unit cells give the following results:

$X=8$ ($a=3$) and $Y=4$ $N=12$
$X=4$ ($a=2$) and $Y=8$ $N=15$
$X=16$ ($a=4$) and $Y=2$ $N=11$
$X=2$ ($a=1$) and $Y=8$ $N=14$ The FIGS. 7 and 8 represent alternate solutions for the unit memory cell, for which a certain number of components play the same role as in the circuit of FIG. 1, and bear the same references.

In the circuit of FIG. 7, the emitter of the transistor 11 is grounded and the terminal LZ is connected, through the resistor 20, to the base of a clearing transistor 19. It is seen that, when this transistor is saturated, the base of the transistor 11 is brought to the potential V*ce* so that this transistor is blocked if it were saturated, i.e. if the flip-flop was in the 1 state.

In the circuit of FIG. 8, a third control transistor 22 has been added in the memory cell, and the terminal LW is connected to the base of the transistors 13 and 22 through the resistors **17*a* and 17*b***. The clearing terminal is suppressed and terminals CW and CW*o* are available, for controlling the switching of the flip-flop to the 1 or to the 0 state. The digit logical circuit is slightly modified and an inverter transistor 24 with its resistors 25, 26 has been added. When the terminal B*y* is brought to the ground potential, the transistors 94 and 24 are respectively blocked and saturated and the terminals CW and CW*o* are at the potentials $$(v1-Vce)\frac{R1}{R1+R2}$$

and V*ce*, R1 and R2 representing the values of resistors 25 and 98. When the terminal B*y* is brought to the potential +V1, these terminals are brought to potentials V*ce* and +V1 (through the resistor 26). On the other hand, when the terminal LW is brought to the ground potential (rest), none of the transistors 13 or 22 can be saturated. On the contrary, when this terminal LW is brought to the potential +V1 (writing), the one among these transistors having its emitter at the ground potential is saturated and the flip-flop sets to the 1 state (if the terminal CW is at the ground potential) or to the 0 state (if the terminal CW*o* is at the ground potential).

The description of the elementary memory according to the invention has been made, by way of example, by using normal transistors. The same circuits may be used with field effect transistors achieved in the form of integrated circuits by using the corresponding voltage values. On the other hand, since the input impedance of these transistors is very high, all the resistors located in series in the control electrodes of the transistors may be suppressed. These modifications are carried out without difficulty in the circuits of FIGS. 3, 4, 5.

What is claimed is:

1. A word-organized memory having X lines and Y columns comprising:

$X \cdot Y$ unit storage cells, each cell including a pair of cross-coupled transistors and two associated transistors, each of said pair being coupled to an associated transistor, one of said associated transistors having a base terminal (LW) to which is applied a line write voltage and an emitter terminal (CW) to which is applied a column write voltage so that said one associated transistors, in response to said voltages saturates and sets said cross-coupled transistors into a state representative of storing of an information, said other associated transistor having another base terminal (LR) to which is applied a line read voltage and collector terminal (CR) to which is applied a column read voltage, so that non-destructive sensing of the state of said cross-coupled transistors is accomplished by applying said line read voltage to said other base terminal (LR), and control terminal means coupled to said cross-coupled transistors for resetting said cross-coupled transistor by applying a clearing voltage to said control terminal means; and selection means coupled to said $X \cdot Y$ storage cells including a source of selection signals (S);

word decoding means having X-output terminal lines for translating said signals into a line selection signal on one out-of-X lines of said output terminals;

an X word logical circuit coupled to each X-output terminal line, and logical circuit having three output terminals connected respectively to said base terminal (LW), said other base terminal (LR), and said control terminal (LZ) of said unit storage cells associated to the one out-of-X lines;

a source of complementary write, read and clear signals ($\overline{W}, \overline{R}, \overline{Z}$) coupled to the input of said word decoding means, and a Y digit logical circuit having two output terminals connected respectively to said emitter terminal (CW) and collector terminal (CR) of said unit storage cell associated to said one out-of-X lines, and said Y logical circuit having an input terminal (B) on which is applied, during a write operation, said column write voltage which is coupled to said terminal (CW) and, during a read operation, on which is measured the state of a selected cross-coupled transistor.

2. A word-organized memory having X lines and Y columns comprising:

$X \cdot Y$ unit storage cells, each cell including a pair of cross-coupled transistors having grounded emitters and two associated transistors, each of said pair being collector coupled to an associated transistor, one of said associated transistors having a base terminal (LW) to which is applied a line write voltage and an emitter terminal (CW) to which is applied a column write voltage so that said one associated transistor, in response to said voltages saturates and sets said cross-coupled transistors into a state representative of storing of an information, said other associated transistor having another base terminal (LR) to which is applied a line read voltage and collector terminal (CR) to which is applied a column read voltage, so that non-destructive sensing of the state of said cross-coupled transistors is accomplished by applying said line read voltage to said other base terminal (LR), and a third associated transistor collector coupled to said cross-coupled transistors and having a base control terminal (LZ) for resetting said cross-coupled transistor, by applying a clearing voltage to said control terminal; and selection means coupled to said $X \cdot Y$ storage cells including a source of selection signals (S);

word decoding means having X-output terminal lines for translating said signals into a line selection signal on one out-of-x lines of said output terminals;

an X word logical circuit coupled to each X-output terminal line, and a logical circuit having three output terminals connected respectively to said base terminal (LW), said other base terminal (LR), and said control terminal (LZ) of said unit storage cells associated to the one out-of-x lines;

a source of complementary write, read and clear signals ($\overline{W}$, $\overline{R}$, $\overline{Z}$) coupled to the input of said word decoding means, and a Y digit logical circuit having two output terminals connected respectively to said emitter terminal (CW) and collector terminal (CR) of said unit storage cell associated to said one out-of-x lines, and said Y logical circuit having an input terminal (B) on which is applied, during a write operation, said column write voltage which is coupled to said terminal (CW) and, during a read operation, on which is measured the state of a selected cross-coupled transistor.

References Cited

UNITED STATES PATENTS

| | | | |
|---|---|---|---|
| 3,177,373 | 4/1965 | Graham | 340—173X |
| 3,177,374 | 4/1965 | Simonian et al. | 307—247X |
| 3,364,362 | 1/1968 | Mellott | 340—173X |
| 3,417,265 | 12/1968 | Lee III | 307—247 |

BERNARD KONICK, Primary Examiner

J. F. BREIMAYER, Assistant Examiner

U.S. Cl. X.R.

307—291